UNITED STATES PATENT OFFICE.

PAUL THOMASCHEWSKI, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

1,010,463.     Specification of Letters Patent.     Patented Dec. 5, 1911.

No Drawing.     Application filed February 28, 1911. Serial No. 611,361.

*To all whom it may concern:*

Be it known that I, PAUL THOMASCHEWSKI, doctor of philosophy, chemist, a citizen of the German Empire, residing at Vohwinkel, near Elberfeld, Germany, have invented new and useful Improvements in Vat Dye, of which the following is a specification.

My invention relates to the manufacture and production of new vat dyestuffs of the anthraquinone series. The process for their production consists in condensing by means of sulfuric acid anthraquinone mercaptans with oxyanthraquinones.

The new dyes are after being dried and pulverized reddish to brown powders soluble in concentrated sulfuric acid generally with from a green to greenish-blue coloration; dyeing cotton from an alkaline hydrosulfite vat from red to orange to brown shades and possess probably the following general formula:

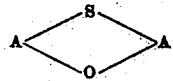

in which A means an anthraquinone radical.

In order to illustrate the new process more fully the following example is given, the parts being by weight: 3 parts of anthraquinone-1-mercaptan and 4 parts of oxyanthraquinone are heated to 160-170° C. with 60 parts of a 98 per cent. sulfuric acid until the melt has assumed a green coloration and the quantity of the dyestuff formed does no longer increase. The melt is diluted with 600 parts of water, the dye is filtered off and boiled with dilute caustic soda lye. It can be purified by a fractional recrystallization from boiling quinolin in which the pure product is only soluble with difficulty. It forms red-brown needles soluble in boiling naphthalene with an orange coloration and in concentrated sulfuric acid with a green coloration. It dyes cotton from an alkaline hydrosulfite vat brown shades, turning yellowish-red by rinsing and soaping. The dye has most probably the formula:

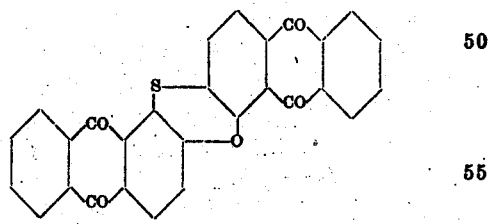

Other mercaptans can be used *e. g.* anthraquinone-1.5-dimercaptan, 5-aminoanthraquinone-1-mercaptan, anthraquinone-2-mercaptan, etc., and other oxyanthraquinones *e. g.* anthrarufin, 2-oxyanthraquinone, anthraflavinic acid, 5-amino-1-oxyanthraquinone, xanthopurpurin, etc.

I claim:—

1. The herein described new vat dyes having probably the following general formula:

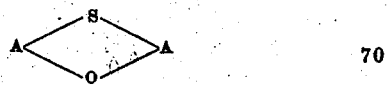

in which A means an anthraquinone radical, which dyes are after being dried and pulverized reddish to brown powders soluble in concentrated sulfuric acid generally with from a green to greenish-blue coloration; dyeing cotton from an alkaline hydrosulfite vat from orange to red to brown shades, substantially as described.

2. The herein described new vat dye having probably the formula:

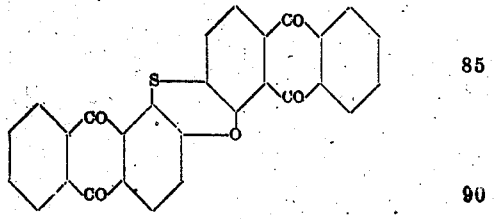

which forms after recrystallization from boiling quinolin red brown needles soluble in boiling naphthalene with an orange coloration; being soluble in concentrated sulfuric acid with a green coloration, and dyeing cotton from a hydrosulfite vat yellow-red shades, substantially as described.

In testimony whereof I have hereunto set my hand in the presence of two subscribing witnesses.

PAUL THOMASCHEWSKI. [L. S.]

Witnesses:
    CHAS. J. WRIGHT,
    ALFRED HENKEL.

Copies of this patent may be obtained for five cents each, by addressing the "Commissioner of Patents, Washington, D. C."